United States Patent [19]

Jones

[11] 4,097,865
[45] Jun. 27, 1978

[54] ELECTRONIC COUNTERMEASURE SEQUENCE TIMER

[75] Inventor: Gerald N. Jones, Inyokern, Calif.

[73] Assignee: The United States of America as represented by the Secretary of the Navy, Washington, D.C.

[21] Appl. No.: 152,464

[22] Filed: Jun. 1, 1971

[51] Int. Cl.² .............................................. G01S 7/38
[52] U.S. Cl. .................................... 343/18 E; 331/78
[58] Field of Search .......................... 343/18 E, 18 R; 35/10.4; 331/78

[56] References Cited

U.S. PATENT DOCUMENTS

| 3,163,862 | 12/1964 | Jenny ................................ 343/18 E |
| 3,219,744 | 11/1965 | Mazziotti et al. ...................... 35/10.4 |
| 3,320,349 | 5/1967 | Pollack et al. ........................ 35/10.4 |
| 3,604,828 | 9/1971 | Perkovich ........................... 343/18 E |
| 3,622,905 | 11/1971 | Brown ............................... 343/18 E |

Primary Examiner—T.H. Tubbesing
Attorney, Agent, or Firm—R. S. Sciascia; Roy Miller

[57] ABSTRACT

An electronic countermeasures sequencer having a variable period clock, a shift register, a control switch for selecting manual or automatic mode, a ones detector, a zeros detector, and an interface driver.

6 Claims, 3 Drawing Figures

ELECTRONIC COUNTERMEASURE SEQUENCE TIMER

BACKGROUND OF THE INVENTION

Present electronic countermeasure (ECM) units being employed against threat missile sites have certain limitations and these limitations are known and exploited by the missile site radar operators when manually tracking a target, whether it is a single aircraft or a formation. It was envisioned that by attacking the threat radar's display subsystem, which is the key to successful manual tracking, an increase in the effectiveness of the ECM units could be realized resulting in greater missile miss distances. To accomplish this, a time sequencer unit was conceived and designed.

Present ECM units having deception repeaters and noise jammers are effective in causing loss of automatic tracking abilities of threat system radars. However, the effectiveness of these ECM units against at least one radar is greatly reduced when it is being operated manually.

Noise jamming when used on a single aircraft reveals angles in azimuth and elevation to the tracking radar while denying it the range. To counter the jammer, the threat radar operator, narrows the noise strobe on his B scope by reducing his system gain, thus enabling him to track in angle the noise source. By using the three point guidance mode (radar, missile, and target) of the threat missile system, he can direct the missile to the target. Clearly, single aircraft missions with jammers cannot be flown; therefore, formations of aircraft with jammer pods are used.

Deception repeaters as presently configured deny angle information of an aircraft while revealing relative range information to the threat radar operator. When a deception repeater is being used, an experienced radar operator will counter by increasing his system gain so that the aircraft skin return can be seen (which always appears at one side of the repeated return). Then he tracks the skin return ignoring the repeated returns. Thus the procedure for countering the deception repeater (increased gain) is opposite to that used for countering noise jamming (decreased gain).

It is apparent that to transmit with both the noise jammer and the deception repeater, simultaneously, is to cancel the effectiveness of either system and to furnish improved target tracking information to the threat radar operator.

The basic objective of the present invention is to maximize the confusion of the radar operator by pseudo-randomly switching between the deception repeater and noise jammers. This proposed countermeasure technique is designed to attack the man in the control loop through the radar display subsystem. By the use of certain cyclic rates of switching, actual operator discomfort will be caused, thus influencing the mental and physical abilities of the operator, which in turn would further reduce total system capability.

Additionally, by use of a data link with a formation flight, apparent targets could be moved around from position to position, confusing the operator. The ECM, using a formation and data link, would be simultaneous pulsed jamming. This technique requires that one pilot pulse his vertically polarized jammer at the same time another pilot in the formation pulses his horizontally polarized jammer. The result would be a false target position indication on the tracking radar scope.

DESCRIPTION OF THE PREFERRED EMBODIMENT

Figure 1:
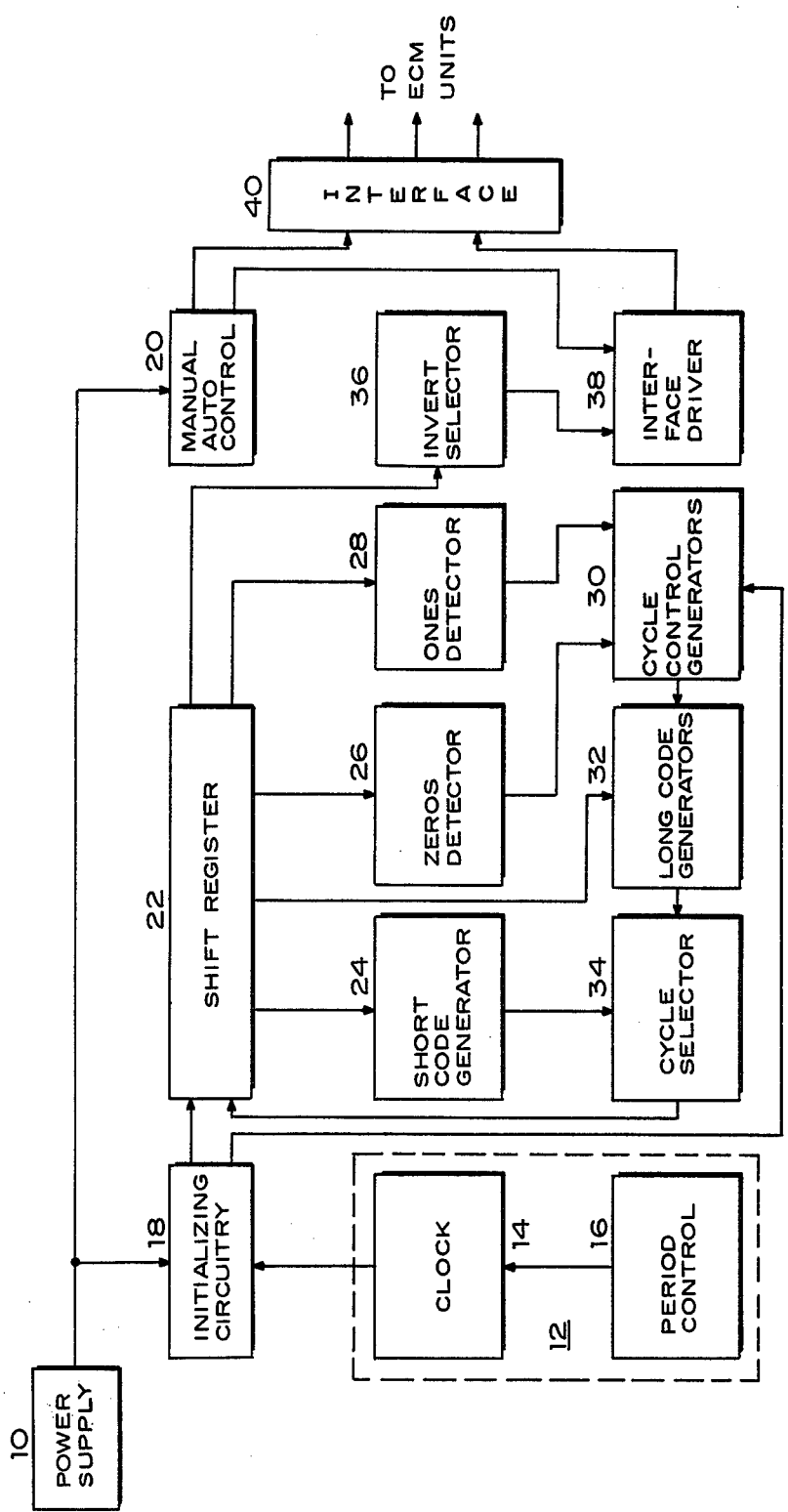
FIG. 1 is a block diagram of the present invention.

The present invention, shown in block form in FIG. 1, comprises power supply 10, variable period clock 12 including clock 14 and period control 16, initializing circuitry 18, manual/automatic control 20, and shift register 22. Also included, and coupled to shift register 22, are short code generator 24, zero detector 26, ones detector 28, generators cycle control 30, long code generator 32, and cycle selector 34. And, additionally included are invert selector 36, interface driver 38, and interface 40 for providing the system output to the electronic countermeasures units.

Figure 2:
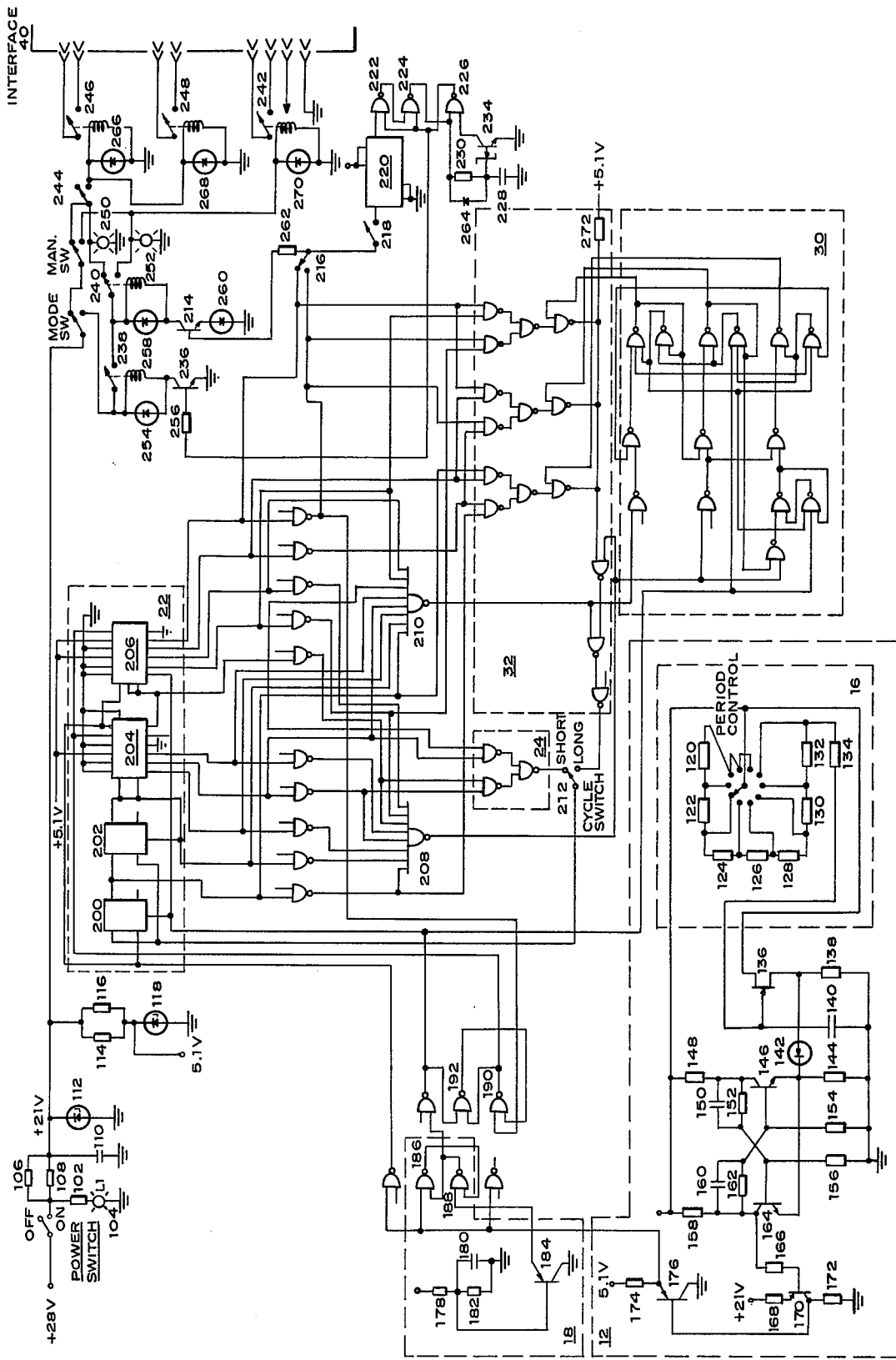
FIG. 2 is a schematic diagram of the preferred embodiment of the present invention.

The schematic diagram of the preferred embodiment of the present invention is shown in FIG. 2 wherein like numerical designations are shown to indicate the preferred component composition of the blocks of FIG. 1. If shift register 22 is a ten-bit shift register and the clock period is adjustable over a range of 0.5 seconds to 5 seconds per period in steps of 0.5, 1.0, 1.5, 2.0, 2.5, 3.0, 4.0, and 5.0 seconds, the clock cycle times for transmitting with either ECM unit are limited to a maximum of 8 clock periods. To extend the pseudo-random code cycle beyond the 8 clock periods two additional code generators are used, making it a three part code system that requires 1,673 clock periods per cycle. Since the clock period can vary from 0.5 to 5 seconds per pulse, the time consumed for a complete code cycle varies from a minimum of approximately $0.5 \times 1,673 = 836.5$ seconds, or 14 minutes, to a maximum of 139.25 minutes, or 2.32 hours.

By way of illustration only, the sequencer of FIG. 2 may have the following component type or values:

| Numeral | Component | Type or Value |
|---|---|---|
| 102 | Resistor | 100 ohm, ½ watt |
| 104 | Lamp | |
| 106 | Resistor | 40 ohm, 5 watt |
| 108 | Resistor | 35 ohm, 5 watt |
| 110 | Capacitor | 100 microfarad, 50 volt |
| 112 | Diode | 1N2985B |
| 114 | Resistor | 120 ohm, 5 watt |
| 116 | Resistor | 150 ohm, 5 watt |
| 118 | Diode | 1N4233A |
| 120 | Resistor | 80 kilohm |
| 122 | Resistor | 70 kilohm |
| 124 | Resistor | 40 kilohm |
| 126 | Resistor | 42 kilohm |
| 128 | Resistor | 38 kilohm |
| 130 | Resistor | 35 kilohm |
| 132 | Resistor | 37 kilohm |
| 134 | Resistor | 38 kilohm |
| 136 | Unijunction transistor | 2N491 |
| 138 | Resistor | 3.3 kilohm |
| 140 | Capacitor | 10 microfarad, 20 volt |
| 142 | Diode | 1N4001 |
| 144 | Resistor | 300 ohm |
| 146 | Transistor | 2N1308 |
| 148 | Resistor | 560 ohm |
| 150 | Capacitor | .01 microfarad |
| 152 – 156 | Resistor | 10 kilohm |
| 158 | Resistor | 560 ohm |
| 160 | Capacitor | 500 picofarad |
| 162 | Resistor | 10 kilohm |
| 164 | Transistor | 2N1306 |
| 166 | Resistor | 1 kilohm |
| 168 | Resistor | 2 kilohm |

-continued

| Numeral | Component | Type or Value |
|---|---|---|
| 170 | Transistor | 2N1307 |
| 172 | Resistor | 750 ohm |
| 174 | Resistor | 7.5 kilohm |
| 176 | Transistor | 2N404 |
| 178 | Resistor | 750 kilohm, ¼ watt |
| 180 | Capacitor | 1.5 microfarad, 10 volt |
| 182 | Resistor | 1.6 megaohm, ¼ watt |
| 184 | Transistor | 2N1307 |
| 200 – 202 | Flip-flop | SN547N(TYP) |
| 204 – 206 | Shift register | CCSL9300(TYP) |
| 208 – 210 | AND gate | SN5430N(TYP) |
| 214 | Transistor | 2N1613 |
| 220 | Shift register | SN7496N |
| 228 | Capacitor | 82 microfarad, 10 volt |
| 230 | Resistor | 390 kilohm, ¼ watt |
| 232 | Zener diode | 3.6 volt |
| 234 | Transistor | 2N1306 |
| 236 | Transistor | 2N1613 |
| 250 | Lamp | |
| 252 | Lamp | |
| 254 | Diode | 1N4001 |
| 256 | Resistor | 2.7 kilohm |
| 258 – 260 | Diode | 1N4001 |
| 262 | Resistor | 2.7 kilohm, ¼ watt |
| 264 | Diode | 1N91 |
| 266 – 270 | Diode | 1N4001 |
| 272 | Resistor | 2.7 kilohm, ¼ watt |

The sequencer is powered by a +28 volt power supply which is regulated inside the sequencer to +21 volts and +5 volts. The 21 volt supply is used to drive the indicating lights, the internal time clock 12, and the reed relays which operate as controls and as a buffer interface between the sequencer and the ECM units. The 5 volt supply is used for the remaining circuitry which, for the most part, consists of integrated circuit modules.

The sequencer operates as follows: When the power switch is placed in the ON position, power light 104 comes on and either lamp 250 or 253, depending on the positions of the MODE and MANUAL switches, will come on. When the MODE switch is in AUTO, a slight delay in initiating lamp 250 or 253 may be experienced if the BLANKING switch 218 is ON and the automatic blanking shift-register 220 triggers the blanking delay multivibrator.

The clock 14, which is a flip-flop driven by a unijunction relaxation oscillator whose period is controlled by the position of period control switch 16, begins to cycle when power is applied. This flip-flop generates a square wave output, which is buffered from the output driver transistor 176 by a level changer stage 170. Transistor 170 sets the lower level of the clock to zero volts, while transistor 176 sets the upper level to approximately 5 volts.

Gates 186 and 188, along with transistor 184 and capacitor 180, constitute the initializing circuitry 18 which clears the register and sets up both the beginning word in register 22 and the code pattern generation control circuits 30. The intializing time is controlled by charging capacitor 180 through resistor 178. As soon as shift register 22 has been cleared and the initial word preset into it, its condition is detected by cross-coupled gates 190 and 192, which enable the clock shift pulses to enter new data into the shift register 22. The code data of shift register 22 are sampled by NAND gates 208 (zeros detector 26) and 210 (ones detector 28) which detect eight consecutive zeros or eight consecutive ones and control the pseudo-random code pattern generation.

Figure 3:
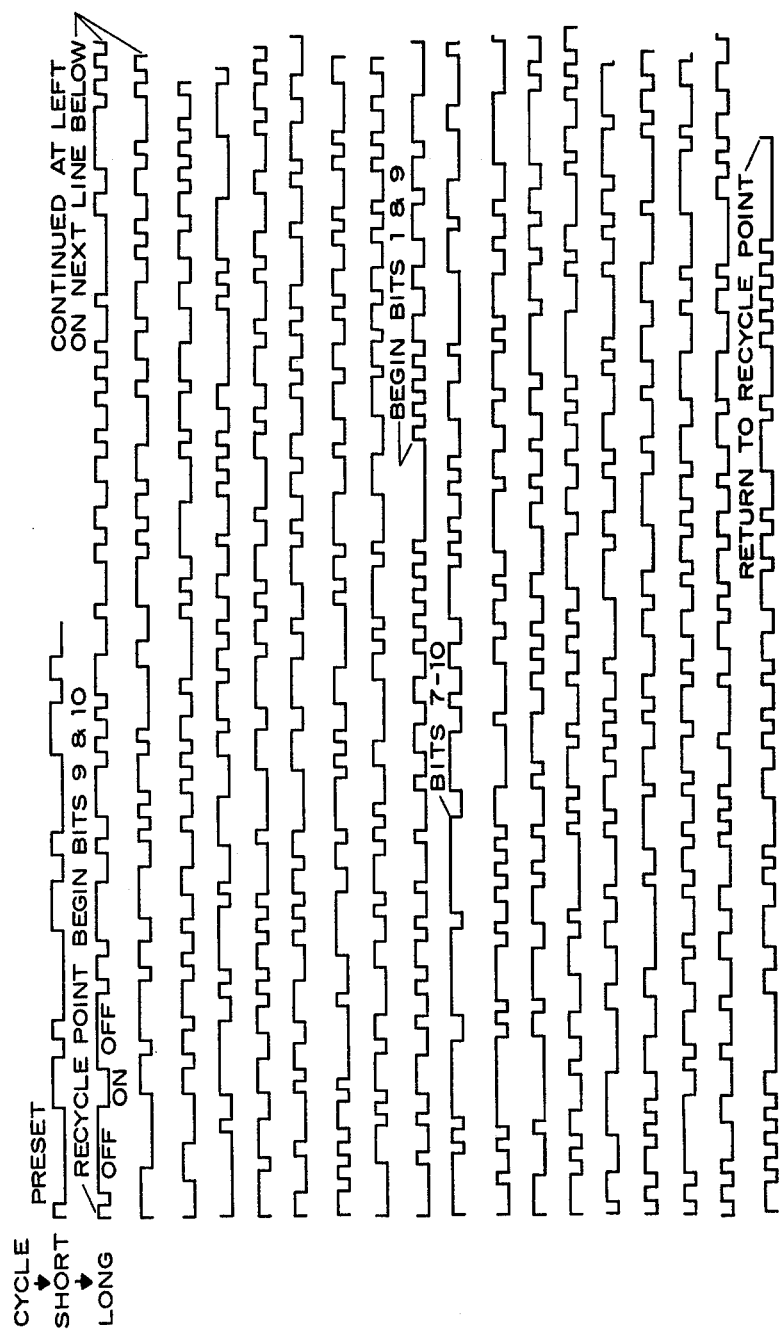
FIG. 3 shows the on-off code waveforms generated for the short and long cycles of the preferred embodiment of the present invention.

Cycle switch 212 (cycle selector 34) is used to select either a three-part long cycle code or a one-part short cycle code for generation in the shift register. The short cycle code is used primarily for checking out external equipment. The three-part code cycle generation begins by using the coincidence of bits 9 and 10 (FIG. 3). When the point in the cycle is reached where eight consecutive zeros are detected by gate 208, the pattern generation is shifted to the coincidence of bits 1 and 9. The code cycle then continues with this pattern generator until eight consecutive ones are detected by gate 210, at which time the control is changed over to the coincidence of bits 7 and 10 to generate the third part of the code. The cycle continues with the third pattern generator in control until eight consecutive zeros are detected by gate 208, at which time control is transferred back to the coincidence of bits 9 and 10; and the cycle repeats. The short cycle code is generated by using the coincidence of bits 4 and 6. FIG. 3 shows the ON-OFF codes generated for both cycles.

In practce, when cycle switch 212 is changed from one cycle to another, the power switch must be turned OFF momentarily to ensure that the data word in shift register 22 is compatible with the cycle desired.

The output of bit 10, and its negation, are fed to relay driver transistor 214 through an inverting switch 216. The relay driver and switch determine whether the ON portion of the waveform in FIG. 3 applies to the transmission time for the jammer or for the deception repeater.

In addition, the output from switch 216 is fed to blanking switch 218. When this switch is in the ON position, the jammer ON condition is used as a trigger for the shift blanking register 220. Each time the jammer turns OFF another 'one' is shifted into register 220; and, at the end of each fifth jammer transmission, gate 222 receives the ones from the blanking register 220. When this occurs, a zero is fed into cross-coupled, self-resetting gates 224 and 226, which are used as a delay multivibrator (DMV). The DMV is initiated by charging capacitor 228 through resistor 230 until the breakdown voltage of diode 232 is reached; at which time transistor 234 turns ON putting a zero to the input of gate 226, which resets the DMV. The delay is controlled by the resistor 230 — capacitor 232 time — constant, and is, in this case, about 3.5 seconds. When the DMV is set, it resets the blanking register 220 to all zeros; and, at the same time, relay driver 236 drops out relay 238. As long as relay 238 is de-energized, all power to the control relays is interrupted. After the delay, relay 238 becomes energized and applies the +21 volt power to relay 240 and its contacts.

When the main control relay 240 becomes energized, interface relay for the repeater 242 (normally closed) is energized. When the contacts of relay 242 open, the blanking bias in the repeater is removed, allowing transmissions to occur. When the main control relay 240 is dropped out, power is applied to the jammer control switch 244; and, if it is in the ON position, interface relays 246 and 248 will pick up. These relays have normally open contacts. When one of the relays closes, voltage is applied to the jamming pod it controls, which turns that pod ON.

Included in the features of the embodiment shown in FIG. 2 are an ON-OFF control to selectively inhibit the jammer from transmitting, a mode control for manual or automatic operation, a clock period control for regulating the clock period time, a short sequence code for testing the equipment, a blanking switch which automatically inserts an off period after each fifth (5) jammer transmission, and an invert switch for interchanging the relative ON-OFF position between the deception repeater and noise jammer in a sequence cycle.

What is claimed is:

1. A random period time sequencer for causing the device to which it is coupled to pseudo-randomly alternate between its operating modes, comprising:
   a power supply;
   a digital shift register providing a plurality of outputs consisting of ones and zeros in the form of electrical signals;
   an initializing circuit coupled to said power supply and having an output coupled to said shift register for providing an electrical signal to said shift register establishing predetermined initial conditions in said shift register;
   a variable period clock coupled to said initializing circuit;
   a zeros detector coupled to an output of said shift register for detecting the totality of zeros in the output and providing an output indicative thereof;
   a ones detector coupled to an output of said shift register for detecting the totality of ones in the output and providing an output indicative thereof;
   at least one code generator coupled to an output of said shift register for generating a digital pattern in response to the coincidence of preselected bits therein;
   a generator cycle control coupled to said ones and zeros detectors, for receiving their outputs, and to said at least one generator for controlling its pattern cycle;
   a cycle selector for selectively coupling said at least one code generator to said shift register; and
   an interface driver coupled to the output of said shift register for providing the sequencer output in response thereto.

2. The sequencer of claim 1 further comprising;
   a mode switch coupled to said interface driver for selecting an automatic or manual operative mode, and
   an invert selector coupled to said shift register and said interface driver for selecting a normal or inverted output waveform.

3. The sequencer of claim 2 wherein said clock includes a flip-flop and a relaxation oscillator wherein said oscillator drives said flip-flop and said flip-flop provides the clock output.

4. The sequencer of claim 3 wherein said shift register is a ten-bit shift register and the sequencer cycle period is 1,673 clock periods.

5. The sequencer of claim 4 wherein said zeros detector detects the occurrence of eight zeros, and said ones detector detects the occurrence of eight ones, in the output of said shift register.

6. The sequencer of claim 5 wherein said interface driver includes a 5-bit shift register coupled to a delay multivibrator and a plurality of relays.

* * * * *